(12) United States Patent
Lucht et al.

(10) Patent No.: US 8,398,012 B2
(45) Date of Patent: Mar. 19, 2013

(54) REVERSIBLE SEAT BELT TENSIONER

(75) Inventors: Andreas Lucht, Horst (DE); Matthias Borgward, Hamburg (DE); Sébastien Baudinet, Saint Lyé la Foret (FR)

(73) Assignee: Autoliv Development AB, Vargarda (SE)

( * ) Notice: Subject to any disclaimer, the term of this patent is extended or adjusted under 35 U.S.C. 154(b) by 98 days.

(21) Appl. No.: 13/060,480

(22) PCT Filed: Aug. 31, 2009

(86) PCT No.: PCT/EP2009/006287
§ 371 (c)(1),
(2), (4) Date: Feb. 24, 2011

(87) PCT Pub. No.: WO2010/031496
PCT Pub. Date: Mar. 25, 2010

(65) Prior Publication Data
US 2011/0147510 A1    Jun. 23, 2011

(30) Foreign Application Priority Data
Sep. 22, 2008 (DE) .......................... 10 2008 048 339

(51) Int. Cl.
*B65H 75/48* (2006.01)
(52) U.S. Cl. .................................. 242/390.8; 242/374
(58) Field of Classification Search ................. 242/374, 242/390.8
See application file for complete search history.

(56) References Cited

U.S. PATENT DOCUMENTS

| 6,726,249 B2* | 4/2004 | Yano et al. ................. 280/805 |
| 2007/0194565 A1* | 8/2007 | Clute .......................... 280/806 |
| 2009/0243273 A1* | 10/2009 | Viernekes ................. 280/801.1 |
| 2012/0211579 A1* | 8/2012 | Maemura et al. .......... 242/390.8 |

FOREIGN PATENT DOCUMENTS

| DE | 10 2005 012623 A1 | 9/2006 |
| DE | 10 2008 040673 A1 | 7/2008 |
| WO | WO 03/099619 A | 12/2003 |
| WO | WO 2007/098744 A | 9/2007 |
| WO | WO 2007/141129 A | 12/2007 |

OTHER PUBLICATIONS

PCT/EP09/006287—International Search Report—Mar. 25, 2010.

* cited by examiner

*Primary Examiner* — Michael Mansen
*Assistant Examiner* — Juan Campos, Jr.
(74) *Attorney, Agent, or Firm* — Brinks Hofer Gilson & Lione

(57) ABSTRACT

A reversible seat belt tensioner includes an electric motor (2), a belt shaft (1) drivable in the belt winding direction by the electric motor (2) via a drive wheel (10), and a drive shaft (9) transmitting the rotational movement of the electric motor (2) to the drive wheel (10). The drive shaft (9) is connected to at least one of the drive wheel (10) and the electric motor (2) via a helical gear unit. The use of a helical gear unit provides the advantage that the rotational axes of the meshing components can be arranged at angles other than 90 degrees with respect to each other because the components in the helical gear units only come into punctiform contact.

6 Claims, 4 Drawing Sheets

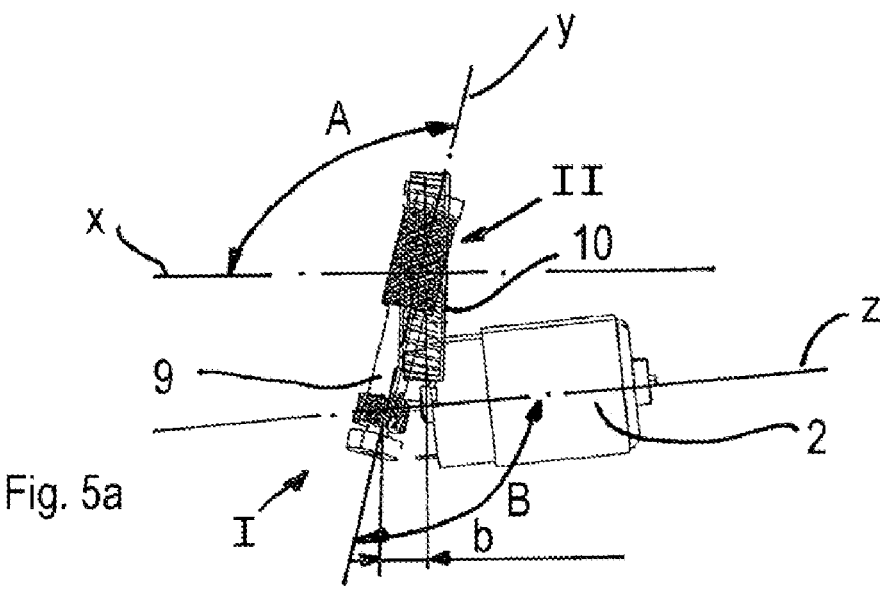
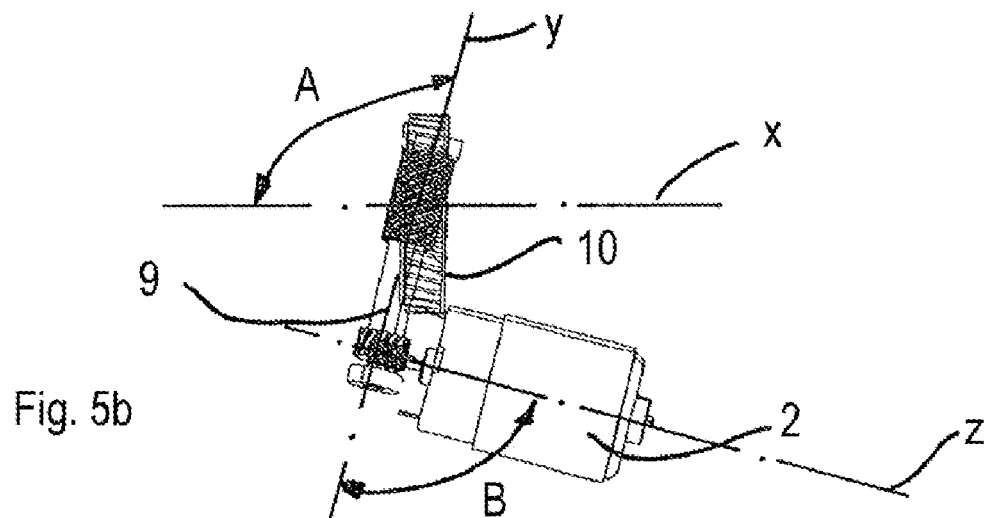
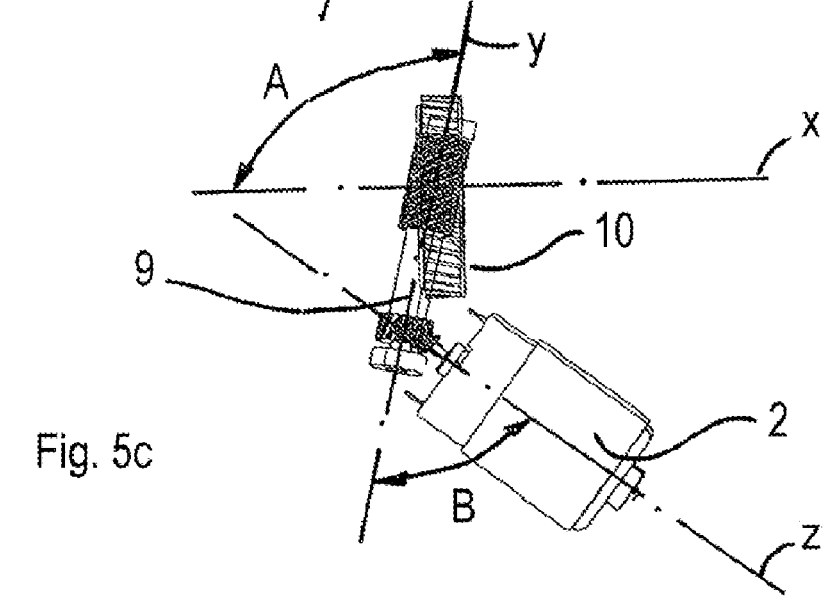

ial engagement. Thereby, the production accuracy requirements are substantially reduced so that the effort and the costs for fulfilling the required production accuracy requirements are substantially reduced.

REVERSIBLE SEAT BELT TENSIONER

CROSS REFERENCE TO RELATED APPLICATIONS

This application claims priority to German Patent Application 10 2008 048 339.7, filed Sep. 22, 2008, and International Patent Application No. PCT/EP2009/006287, filed Aug. 31, 2009.

TECHNICAL FIELD OF THE INVENTION

The invention relates to a reversible seat belt tensioner comprising an electric motor, a belt shaft drivable in the belt winding direction by the electric motor via a drive wheel, and a drive shaft transmitting the rotational movement of the electric motor to the drive wheel.

BACKGROUND OF THE INVENTION

From WO 2003/099619 A2, a reversible seat belt tensioner is known wherein the drive shaft transmitting the rotational movement of the electric motor to the belt shaft is coupled to the electric motor via a crown gear unit and is coupled to the drive wheel via a worm gear unit.

A disadvantage in this embodiment is that the arrangement of the components with respect to each other cannot be freely chosen, as the gear wheels of the gear units deflect the rotational movement by 90 degrees each, and, therefore, the rotational axes of the meshing rotating components have to be arranged at an angle of 90 degrees with respect to each other. It has further turned out that the noises developing in the crown gear unit and in the worm gear unit during the seat belt tensioning, in particular for vehicles of the higher quality class, are no longer tolerated by the vehicle manufacturers.

SUMMARY OF THE INVENTION

It is the object of the invention to provide a reversible seat belt tensioner wherein the electric motor, the belt shaft with the drive wheel and the drive shaft can even be arranged in different orientations with respect to each other so that the reversible seat belt tensioner can have an overall more compact configuration and can even be arranged in cramped installation spaces. Moreover, the noises developing during the belt tensioning shall be reduced.

The solution of the object according to the invention is that the drive shaft is connected to the drive wheel and/or to the electric motor via a helical gear unit. The use of a helical gear unit provides the advantage that the rotational axes of the meshing components can also be arranged at angles not equal to 90 degrees with respect to each other. Thereby, the components can be arranged at any angle with respect to each other so that the arrangement can be carried out in the sense of a compact configuration and utilization of the available free spaces. As the components in the helical gear units only come into punctiform contact, in addition, the noise development is substantially reduced. Helical gear units are generally distinctly known for the fact that helical gears with different helix angles but an equal pitch and the same engagement angle are coupled. The axles can thereby cross at any angle owing to different helix angles. Furthermore, a helical gear unit provides the advantage that the helical gears, in addition to the diameter ratios, by means of the choice of the helix angles provide an additional possibility to change the transmission ratio. Moreover, the helical gears of the helical gear unit can be displaced axially without the helical gears losing Further advantageous embodiments and developments of the invention are described in the sub claims.

In the following, the invention is described in more detail based on preferred embodiments.

BRIEF DESCRIPTION OF THE DRAWINGS

FIG. 5a-5c show an electric motor with drive shaft and drive wheel at an angle smaller than 90 degrees.

DETAILED DESCRIPTION OF PREFERRED EMBODIMENTS

Figure 1:
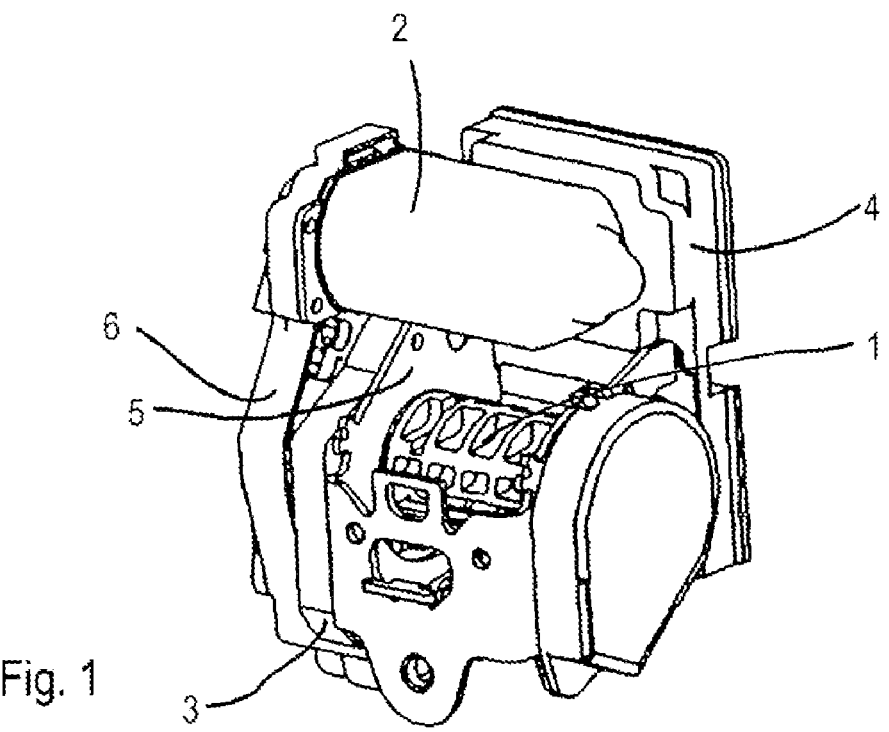
FIG. 1 shows a reversible seat belt tensioner according to the invention.

FIG. 1 shows a reversible seat belt tensioner comprising a seat belt retractor 1 and an electric motor 2 driving the seat belt retractor 1 in the belt winding direction during the reversible tensioning. On the side of the reversible seat belt tensioner, an electronic control unit 4 (ECU) actuating the electric motor 2 is arranged. Furthermore, on the front end of the seat belt retractor housing 5, a gear unit housing 3 comprising a corresponding covering 6 is arranged in which gear unit housing the later described drive shaft along with the associated gear units and the drive wheel for coupling the electric motor 2 to the belt shaft 1 is arranged.

Figure 2:
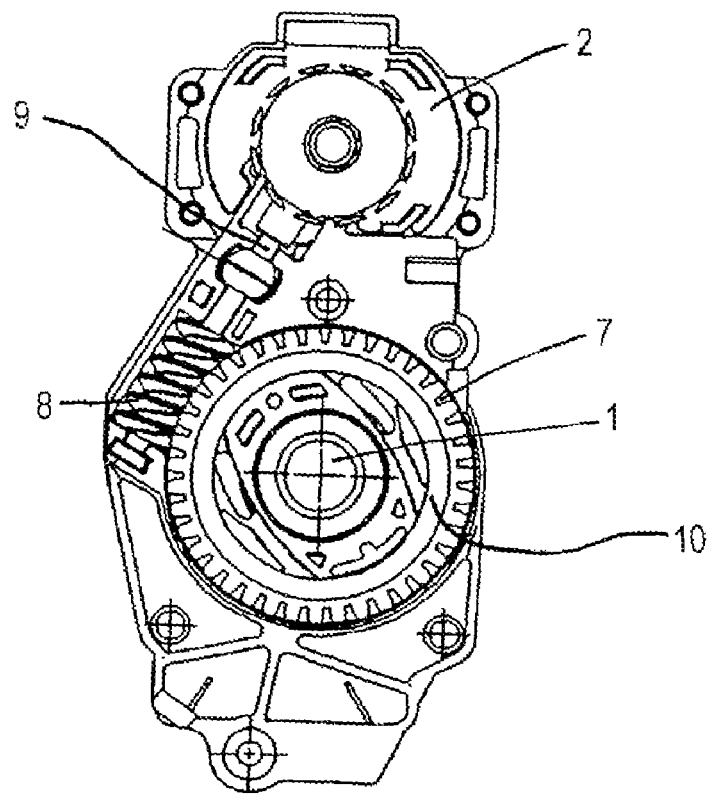
FIG. 2 shows a reversible seat belt tensioner with drive shaft.

FIG. 2 shows the same reversible seat belt tensioner from the gear unit-side, however without covering 6. Between the belt shaft 1 and the electric motor 2 a drive shaft 9 engaging with a gearing 7 of a drive wheel 10 via a gearing 8 can be seen. The connection between the electric motor 2 and the drive shaft 9 is not shown, but will be described later on. The drive wheel 10 can further be connected to the belt shaft 1 by a coupling not shown so that the rotational movement of the electric motor 2 during the belt tensioning is finally changed to a belt winding movement of the belt shaft 1 by rotating the drive shaft 9 and driving the drive wheel 10.

Figure 3:
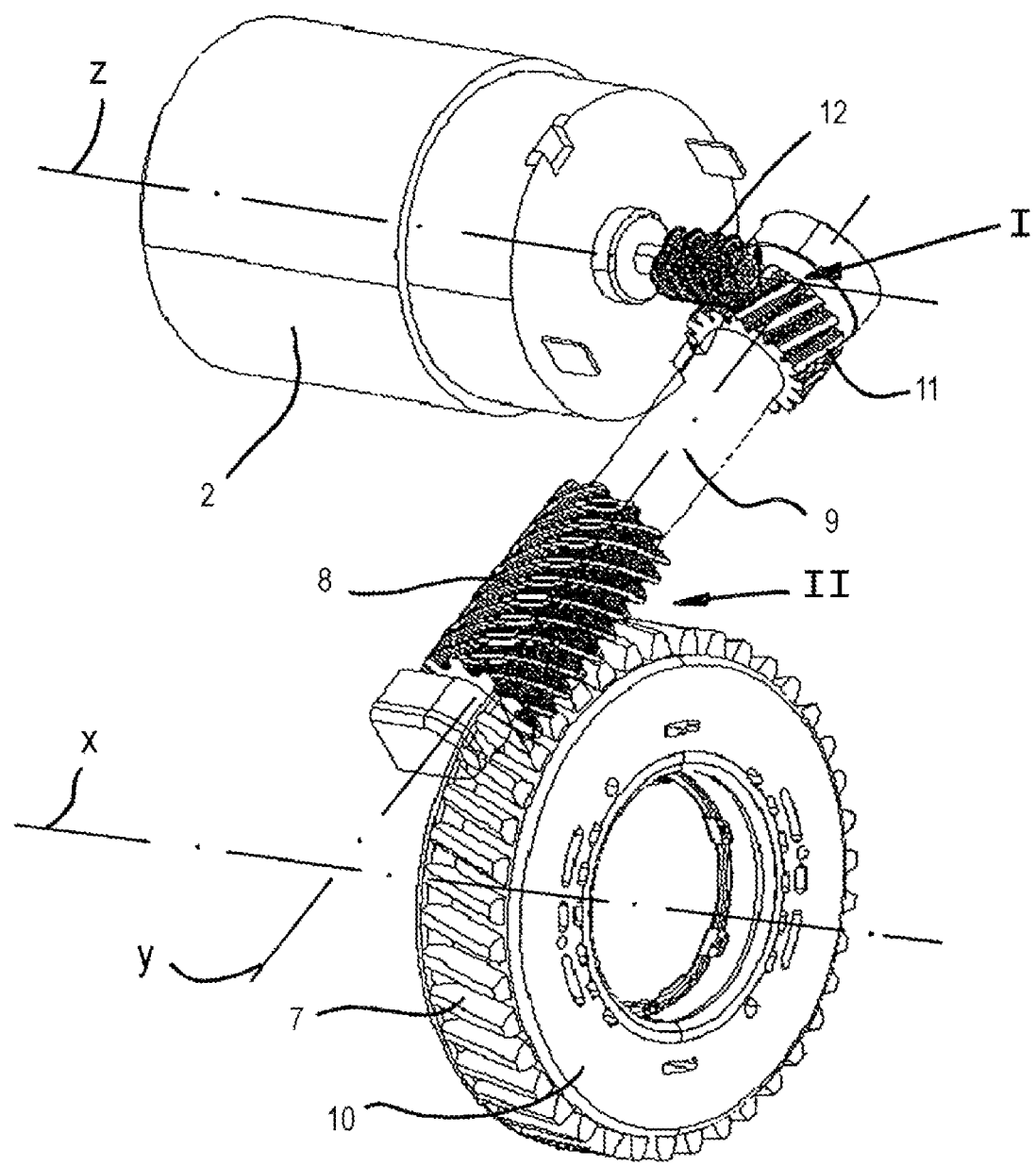
FIG. 3 shows an electric motor with drive shaft and drive wheel.

FIG. 3 shows, for a better visibility, the electric motor 2 with the drive shaft 9 and the drive wheel 10 from FIG. 2 without the belt shaft 1. The electric motor 2 meshes with the drive shaft 9 via a gear unit "I". The rotational movement of the drive shaft 9 is transmitted to the drive wheel 10 via a second gear unit "II". The drive shaft 9 is arranged between the axes "X" and "Z" of the drive wheel 10 and of the electric motor 2 so that the electric motor 2 and the drive wheel 10 engage on different sides of the drive shaft 9 with their gearings 12 and 7 with the gearings 11 and 8 of the drive shaft 9. This results in an overall good force distribution in the drive shaft 9 and, additionally, the existent free spaces on the seat belt tensioner are further fully utilized so that the seat belt tensioner can be configured in an even more compact manner.

Both the gear unit "I" and the gear unit "II" are formed by two meshing gearing pairs 11 and 12 and 7 and 8. Each of the gear units "I" and "II" is configured as a helical gear unit so that the gearings 12 and 11 and 7 and 8 mesh in a screw-gliding manner. The screw-gliding meshing movement of the helical gear unit provides the special advantage that the gearings 11, 12, 7 and 8 only rest against each other via a punctiform contact, and that, thereby, the noise development is substantially reduced.

Furthermore, the gearings 11, 12, 7 and 8 even mesh, in case, the electric motor 2, the drive shaft 9 and the drive wheel 10 do no longer exactly take their desired position owing to production inaccuracies or operational abrasion. The gearings 11, 12, 7 and 8 are configured as helical gearings whereas the helix angles of the gearings 11 and 12 and 8 and 7 resting against each other are angled in the opposite direction.

Figure 4A:
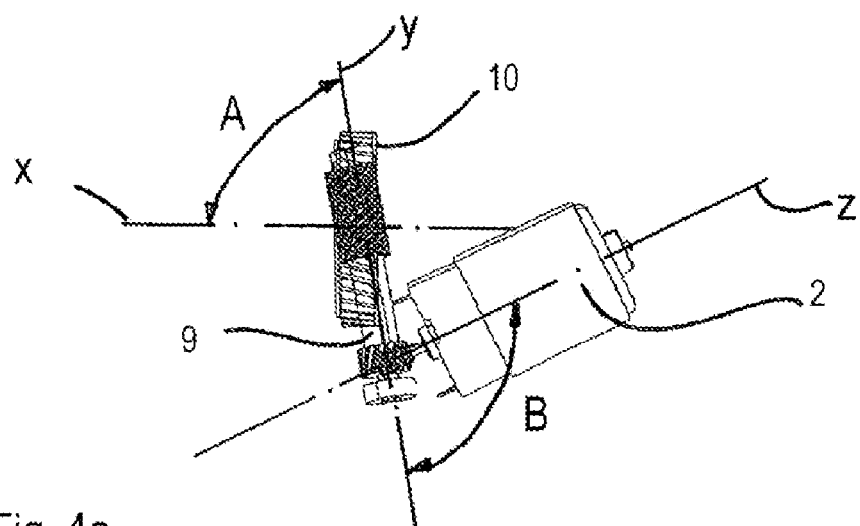
FIG. 4a-4c show an electric motor with drive shaft and drive wheel at an angle greater than 90 degrees.
Figure 4B:
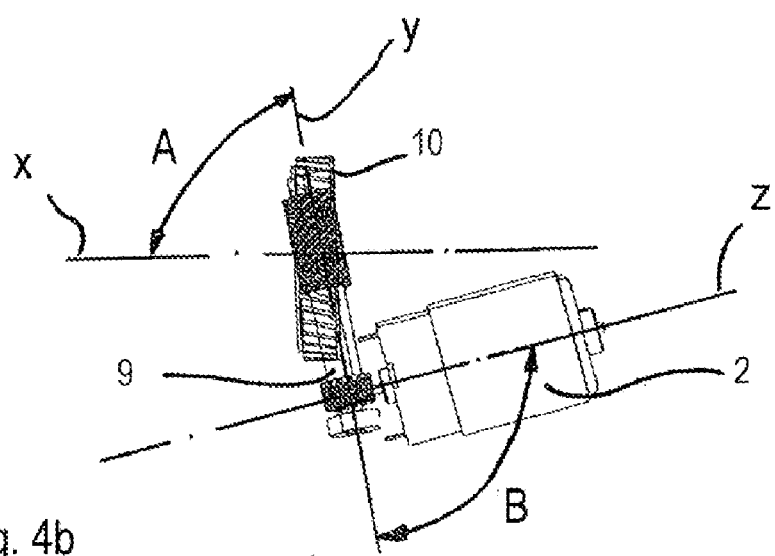
Figure 4C:
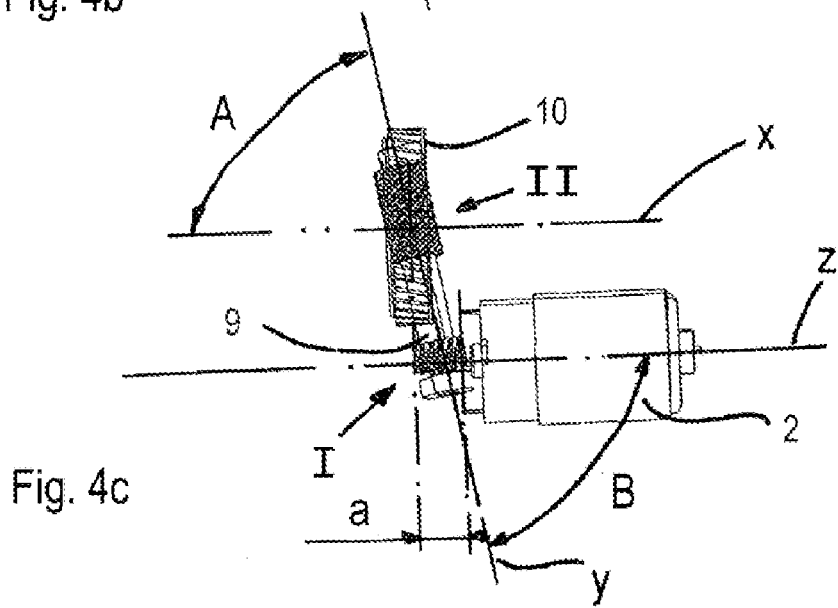

FIGS. 4a to 4c show different arrangements of the electric motor 2, of the drive shaft 9 and of the drive wheel 10, wherein the angle "A" between the rotational axis "X" of the drive wheel 10 and the rotational axis "Y" of the drive shaft 9 is smaller than 90 degrees. The rotational axis "X" of the drive wheel 10, in this embodiment, is identical to the rotational axis of the belt shaft so that the same can be mentally added in the extension. In the position shown in FIG. 4a, the electric motor 2 with its rotational axis "Z" is entangled to an angle "B" bigger than 90 degrees in relation to the rotational axis "Y" of the drive shaft 9 so that the rotational axes "Z" and "X" also form an angle with respect to each other which, in the extreme case, can even be extended up to 90 degrees by choosing the angles "A" and "B" accordingly. The angles "A" and "B" can be changed by the dimensioning of the helix angles of the gearings 11, 12, 8 and 7. Relating to the dimensioning of the helix angles and the orientation of the axes resulting therefrom, it is referred to pertinent technical literature as for example "Maschinenelemente" Roloff/Matek; Vieweg Verlag 2007, Wiesbaden, 18th Edition, Chapter 23. The orientation of the electric motor 2 in relation to the belt shaft, due to the invention, can be chosen such that the available installation space in the vehicle and/or the free space on the reversible seat belt tensioner can be better utilized so that an overall compact configuration of the seat belt tensioner can be realized and/or the seat belt tensioner can be adapted to the determined installation space ratios in the vehicle.

FIGS. 4b and 4c show further alternative allocations at the same angle "A". In FIG. 4b, the angle "B" is chosen equal to 90 degrees so that, here, even a worm gear unit could be chosen for the gear unit "I". In FIG. 4c, the angle "B" is chosen equal to the angle "A", additionally resulting in a parallel arrangement of the rotational axes "X" and "Z". Owing to the helix angle of the helical gear units, the gear units "I" and "II", and, thereby, also the electric motor 2 and the belt shaft, can be arranged in an axial offset "a" with respect to each other, whereas the axial offset "a" can also be affected by the choice of the helix angles. The offset "a" is preferably arranged in the direction of the belt shaft not shown so that even a shorter electric motor 2 can be arranged in the centre next to a longer belt shaft for example between the frame pieces of the seat belt retractor fully utilizing the free space existent between the frame pieces.

FIGS. 5a to 5c show further alternative arrangements with an angle "A" bigger than 90 degrees between the rotational axes "X" and "Y". In FIG. 5a, both the angle "A" and the angle "B" are chosen bigger than 90 degrees resulting in an offset "b" of the gear units "I" and "II", in comparison to the embodiment described in FIG. 4c, now in the other direction. Choosing identical angles "A" and "B" would again result in a parallel arrangement of the electric motor 2 and the seat belt retractor oriented in the direction of the axis "X". FIG. 5b shows an embodiment wherein the angle "B" is again chosen equal to 90 degrees so that, here, also a combination of the gearings 11 and 12 as a worm gear unit would be possible. FIG. 5c shows an embodiment wherein the angle "B" is chosen smaller than 90 degrees so that the angle between the axes "X" and "Z" is further increased.

The invention claimed is:

1. A reversible seat belt tensioner comprising an electric motor generating a rotational movement, a belt shaft drivable in a belt winding direction by the electric motor via a drive wheel, and a drive shaft transmitting the rotational movement of the electric motor to the drive wheel, wherein the drive shaft is connected via a first helical gear unit to the drive wheel and via a second helical gear unit to the electric motor, the drive shaft having a first axis of rotation, the drive wheel having a second axis of rotation, and the electric motor having a third axis of rotation, the first and second axes of rotation being arranged with respect to each other at a first angle and the first and third axes of rotation being arranged with respect to each other at a second angle, at least one of the first and second angles being selected from the group consisting of an acute angle and an obtuse angle.

2. The reversible seat belt tensioner according to claim 1, wherein the first axis of rotation and the second axis of rotation are arranged with respect to each other at the first angle selected from the group consisting of an acute angle and an obtuse angle.

3. The reversible seat belt tensioner according to claim 1, wherein the first and second angles are identical, and wherein the axes of the electric motor and of the drive wheel are arranged parallel to each other.

4. The reversible seat belt tensioner according to claim 1, the first helical gear unit and the second helical gear unit are axially offset with respect to each other.

5. The reversible seat belt tensioner according to claim 1, wherein the drive shaft is arranged between the axes of rotation of the electric motor and of the drive wheel.

6. The reversible seat belt tensioner according to claim 1, wherein—the first axis of rotation and the third axis of rotation are arranged with respect to each other at the second angle selected from the group consisting of an acute angle and an obtuse angle.

* * * * *